Jan. 9, 1968 D. A. VAN DEVEN ETAL 3,362,213
METHOD AND APPARATUS FOR TESTING SEALS
Filed May 26, 1965 2 Sheets-Sheet 1
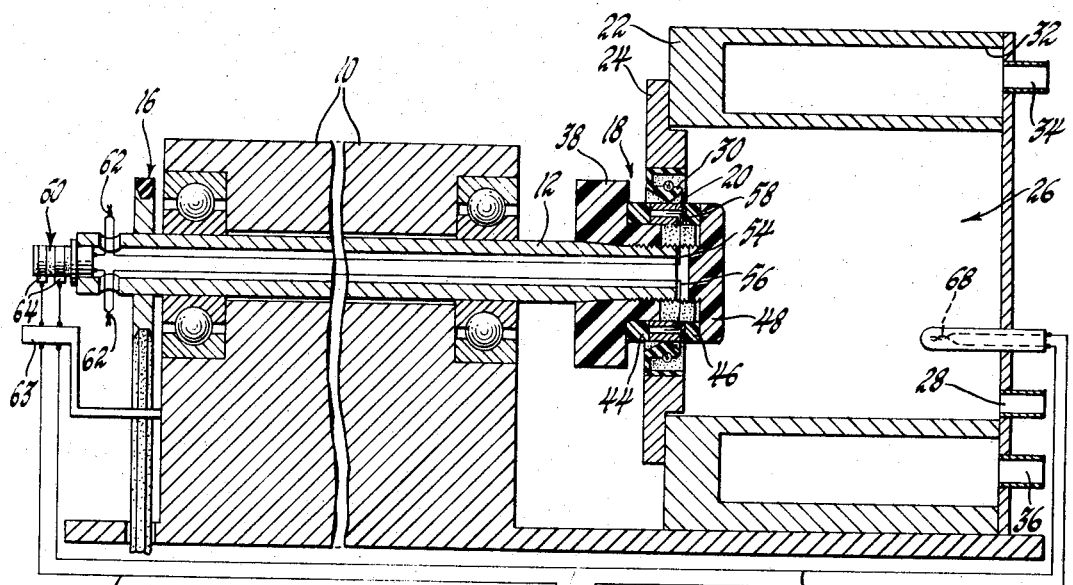
Fig.1
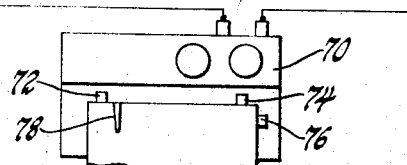
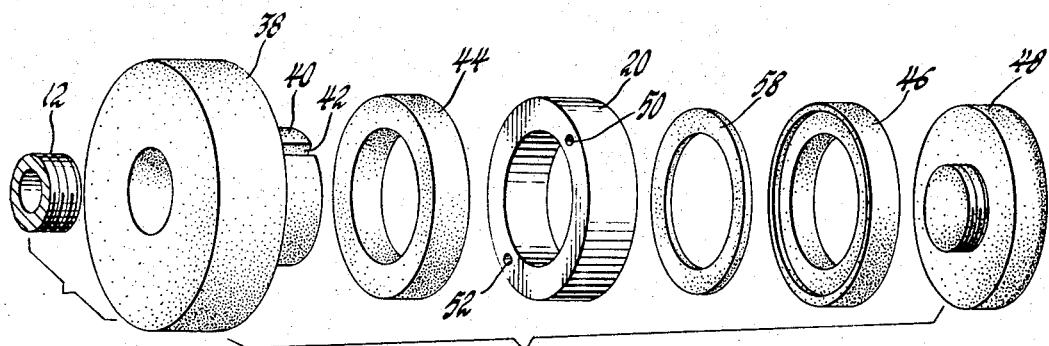
Fig.2
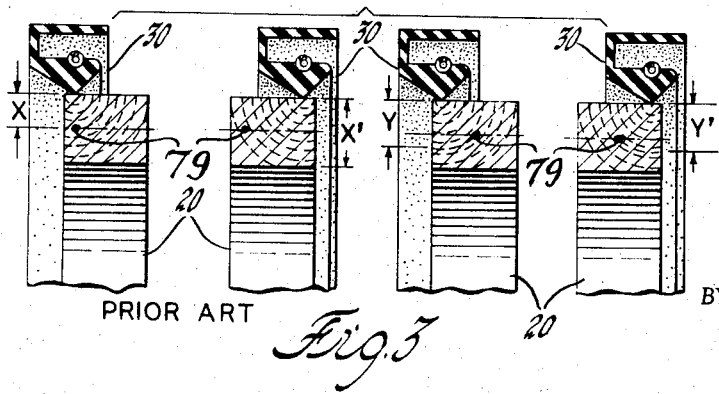
PRIOR ART Fig.3
INVENTORS
Dale A. VanDeven &
BY Robert L. Dega
ATTORNEY INVENTORS
Dale A. VanDeven &
BY Robert L. Dega Albert F. Duke
ATTORNEY

United States Patent Office 3,362,213
Patented Jan. 9, 1968

3,362,213
METHOD AND APPARATUS FOR TESTING SEALS
Dale A. Van Deven, Royal Oak, and Robert L. Dega, Utica, Mich., assignors to General Motors Corporation, Detroit, Mich., a corporation of Delaware
Filed May 26, 1965, Ser. No. 458,959
8 Claims. (73—9)

ABSTRACT OF THE DISCLOSURE

Apparatus for determining the frictional characteristics of a seal including a test ring rotatable relative to the seal, in contact with the seal and a test fluid. The average mean temperature of the test ring is detected by utilizing the test ring as a thermocouple junction and the rise rate of the ring temperature relative to the temperature of the test fluid is indicated.

---

This invention relates to test machines and more particularly to a method of and an apparatus for testing seals.

The objective of a sealing element is to seal fluid for an indefinite period of time under varying conditions of temperature, pressure, motion, lubrication and contamination. A sealing element that has been placed on a rotating shaft will generate heat related to the frictional characteristics of the lip design and material, the design and material of the shaft and the fluid being sealed. It is desirable that this friction be as low as possible to insure maximum seal life while maintaining maximum sealing effectiveness.

In accordance with the present invention, seal testing apparatus is provided for measuring the heat generated due to frictional engagement of the sealing element with a shaft. The apparatus includes a rotatable test shaft assembly comprising a heat conducting ring of small mass which is placed in contact with the sealing element. The test ring is insulated from all large heat sinks by heat insulating elements which surround the test ring except for the outside diameter surface which is contacted by the seal. During relative rotation of the test ring and the seal, the rise rate of the average mean temperature of the test ring relative to the sealed fluid is measured. We have discovered that the data thus obtained represents the major portion of the heat generated due to friction and provides a reliable indication of the propensity of the seal under test to leak.

A more complete understanding of the present invention may be had from the following detailed description which should be read in conjunction with the drawings in which:

FIGURE 1 is a sectional view taken in the vertical plane of the apparatus of the present invention;

FIGURE 2 is an exploded view of the test shaft assembly;

FIGURE 3 is a sectional view showing the seal in different positions on the test ring;

Figure 4:
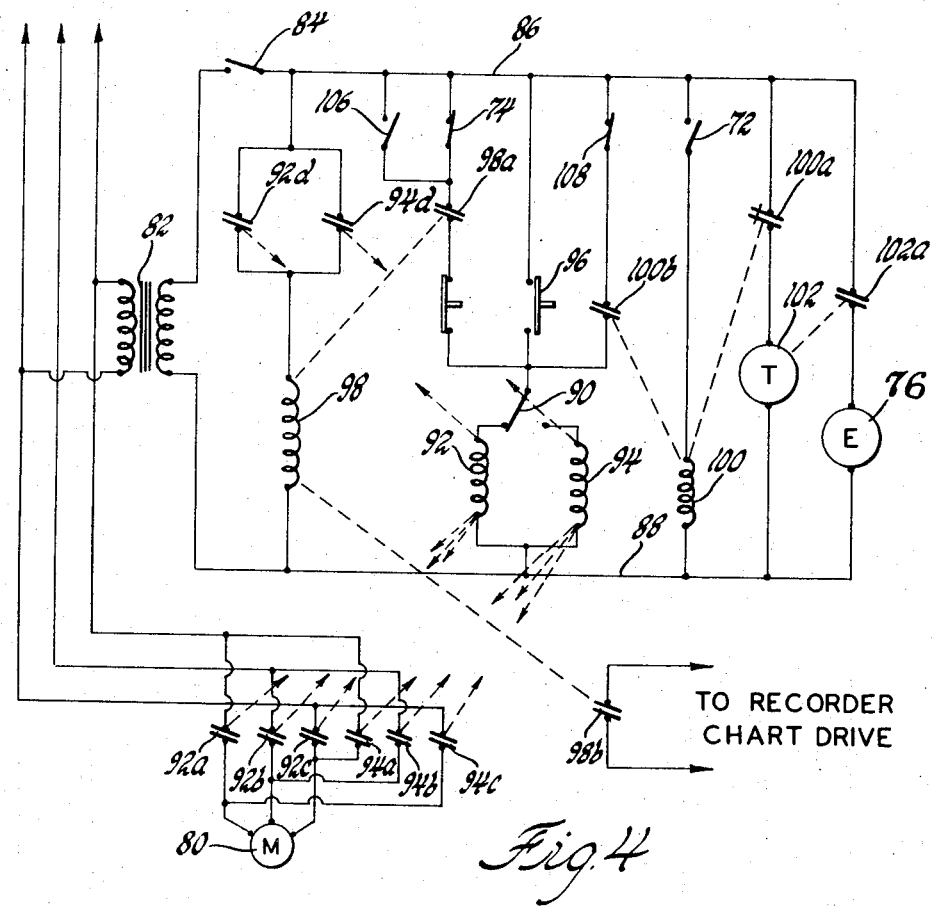
FIGURE 4 is a schematic representation of the control circuit of the present invention.

Referring now to the drawings and initially to FIGURE 1, the apparatus of the present invention comprises a base 10 rotatably supporting a hollow spindle 12. The spindle 12 may be rotated in either direction by means of a pulley and belt assembly 16 from a variable speed drive (not shown). A test shaft assembly generally designated 18 includes a test ring 20 and threadingly engages the spindle 12 for rotation therewith. A test head 22 supports a seal retainer plate 24 and includes an inner chamber 26 which receives a test fluid through inlet 28 from a sump (not shown). A seal 30 is carried by the retainer 24 with its inner periphery in contact with the surface of the test ring 20. The test head 22 is movable on the base 10 to position the seal 30 over the test ring 20. The test head 22 includes an outer jacket 32 which is filled with oil that is continuously circulated through an inlet 34 from a pump (not shown) and returned through an outlet 36 to a sump and heater system (not shown). Thus the fluid in the inner chamber 26 is indirectly heated by the heater system associated with the circulating oil in the outer jacket 32.

Referring to FIGURE 2 the test shaft assembly 18 comprises an adapter 38 having an extension 40 provided with a slot 42 extending therethrough. The test ring 20 is supported on the extension 40 between front and rear spacers 44 and 46. An end cap 48 is adapted to threadingly engage the inner surface of the extension 40 to secure the spacers and test ring to the adapter 38. The adapter, the spacers and the end cap are all formed of a heat insulating material such as nylon having a low specific heat to prevent excessive dissipation of heat from the test ring 20. The test ring 20 is provided with channels 50 and 52 located along a diameter of the test ring. An iron wire 54 is received by the channel 50 and a constantan wire 56 is received by the channel 52. The rear spacer 46 is adapted to receive a rubber retained spring 58 which when assembled retains the wires 54 and 56 in position. Thus the wires 54 and 56 form a thermocouple with the test ring 20 being the thermocouple junction. This is an important feature of the present invention and greatly reduces the error introduced in prior art seal testing apparatus.

The iron and constantan wires 54 and 56 extend through the slot 42 and the hollow spindle 12 and are junctioned to a slip ring assembly 60. The junctions 62 of the iron and constantan wires with the copper wires of the slip ring assembly 60 are each placed in the atmosphere to insure an isothermal condition. Iron and constantan wires 54' and 56' are connected to a brush holder 63 which carries platinum brushes 64 in contact with the slip ring assembly 60. The constantan wire 56' is connected with an iron wire 66 to form a thermocouple junction 68 within the sealed test fluid chamber 26.

The iron wires 66 and 54' are connected to a recorder 70. The recorder 70 is a conventional Varian recorder model G–14 which has been modified for use in combination with the apparatus of the present invention by installing low and high limit switches 72 and 74 and an event marker 76. The switches 72 and 74 are responsive to the movement of the recorder pen 78. The switches 72 and 74 are conventional rotary microswitches and the event marker 76 is of conventional design and therefore are not shown in detail.

During relative rotation between the test ring 20 and the seal 30, the seal may be located at a number of different positions. It is imperative, in order to eliminate any errors resulting from changes in seal positions, that the average mean temperature of the test ring be detected. This is done in the present invention by making the test ring itself a thermocouple junction as opposed to detetcing the temperature of the test ring at some particular location. This will be more apparent from an examination of FIGURE 3 which shows a comparison between a well known prior art approach to temperature measurement and the approach taken in the present invention. In the prior art approach, a thermocouple is located for example in the position denoted by the dot 79. The dash lines depict radial zones of decreasing temperature. It will be apparent that the temperaure measured by the thermocouple will depend on the position of the seal and that as the seal moves from the extreme left side to the extreme right side of the ring that the radial distance X is increased to X' and the temperature detected decreases. When the ring itself is used as the thermocouple junction, the average mean temperature of the ring is detected and the effective thermocouple junction denoted by the dot in the last two illustrations is located at the radial zone temperature distance Y equal to Y' and is independent of the seal position on the ring.

As indicated previously, the apparatus of the present invention is based on the assumption that the major portion of the heat generated due to friction can be measured by observing the temperature rise rate of the test ring 20 during rotation relative to the seal 30. This not only provides more reliable data but also reduces the test period to a matter of seconds. This allows several successive tests in a small interval of time which may be compared to further insure that the data recorded in any particular test is reliable. Moreover, with considerably longer test periods, the heat losses from the test ring 20 to the atmosphere and to the test oil will cause measurement errors and overheating of the test ring. To reduce the test cycle time the drive mechanism for the spindle 12 is energized when the temperature of the test ring is at a temperature between 0° and 20° F. above the temperature of the test oil. In order to measure the temperature rise rate after the test ring 20 is up to speed and the rise rate has reached a constant value, the rise rate measurements are taken after the temperature of the test ring has risen 6° to 10° F. above the temperature at which the drive mechanism is energized and the temperature variations are confined to within 35° F. This criteria of testing is given by way of example and is accomplished by using the zero to one millivolt scale on the recorder 70 and by appropriate location of the low and high limit switches 72 and 74.

Referring to FIGURE 4 there is shown a portion of the control circuit used for controlling the rotation of the test ring 20 during testing of the seal 30. A motor 80 for driving the spindle 12 is connected to a three phase, 440 volt line and a transformer 82 drops the line voltage to 115 volts. A switch 84 connects conductors 86 and 88 to the secondary of the transformer 82. A manually operable control switch 90 selectively connects forward and reversing relays 92 and 94 respectively through a normally open momentary start switch 96 to control the direction of rotation of the drive motor 80. Relay contacts 92a through 92d and 94a through 94d are respectively controlled by the relays 92 and 94. A relay 98 connected in series with the contacts 92d and 94d control relay contacts 98a and 98b and a relay 100 connected in series with the low limit switch 72 controls the relay contacts 100a and 100b.

A timer 102 is connected in series with the normally closed contact 100a and controls the event marker 76 through the contact 102a. A manually operative high limit bypass switch 106 is connected in parallel with the normally closed high limit switch 74. A manually operative bypass switch 108 is connected in series with the contact 100b.

The procedure for testing a seal is as follows. With the seal 30 in contact with the test ring 20 and the switch 84 closed, the start switch 96 is closed to energize the drive motor 80 and the relay 98. The limit switches 72 and 74 are located on the recorder 70 so that when the pen 78 is in the center scale position, the low limit switch 72 will be open and the high limit switch 74 will be closed and the recorder will indicate the temperature differential between the test ring 20 and the test fluid. As the temperature differential increases, the pen 78 will open the high limit switch 74 and the motor 80 will be deenergized as will the circuit to the recorder chart drive. The temperature of the test ring 20 will immediately decrease due to the cooling effect of the test oil causing the pen 78 to move downscale to a position closing the low limit switch 72. Closure of the low limit switch 72 energizes the relay 100 which energizes the motor 80 through the contacts 108 and 100b. At the same time, the timer 102 will reset and the chart drive on the recorder 70 will start through energization of the relays 100 and 98 respectively. As the temperature differential begins to increase again, the low limit switch 72 will open deenergizing the relay 100 thus energizing the timer 102 and causing the event marker 76 to make a mark on the recorder chart. The driver motor 80 will remain energized through the high limit switch 74. When the timer 102 has timed out, the event marker 76 will make another mark on the chart and will move back to its original position leaving a record of the preset time interval. As the temperature differential continues to increase, the pen 78 will open the high limit switch 74 and the shaft and chart drive will stop. If the bypass switch 108 is open, then each cycle will have to be started manually and if the bypass switch 106 is closed, each cycle will have to be stopped manually. Otherwise, the pen 78 will automatically cycle between the low and high limit switch position.

Figure 5:
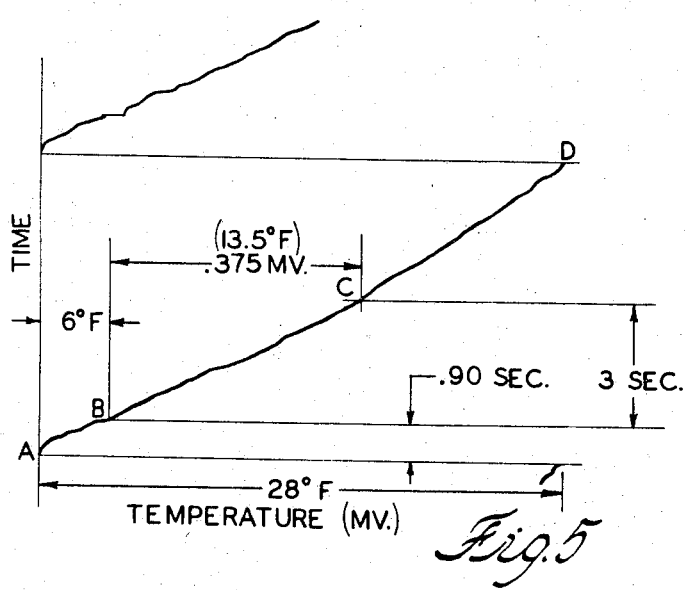
FIGURE 5 is a graph showing the time temperature characteristic of the test ring.

Referring to FIGURE 5, there is shown a typical time temperature characteristic obtained from the apparatus of the present invention. The spindle 12 is started at point A and is up to speed at point B where the event marker is energized. After a predetermined time interval, the mark C is made which provides an accurate indication of the temperature rise over the set time interval. At point D the high limit switch 74 is contacted by the recorder pen 78 which then moves back toward the zero reading where the low limit switch 72 is contacted to initiate another cycle.

By comparing the temperature rise rate of the test ring 20 for a given seal under test with upper and lower acceptable temperature rise rate limits which have been established through previous extensive leakage tests of a seal having the same design and material, a determination can be made of whether the seal under test will leak.

As indicated previously the temperature rise rate of the test ring 20 is not only dependent on the seal design and material but also on the type of sealed fluid and the material and design of the test ring itself. By holding these latter variables constant for different seal design and material, the temperature rise rate will indicate expected seal performance. It will be apparent, however, that the apparatus is not limited to measuring seal performance but may also be used to measure the effect of different sealed fluids or shafts of different material and design.

While the invention has been described with regard to a preferred embodiment thereof, this should not be construed in a limiting sense. Modifications and variations will now occur to those skilled in the art. For a definition of the invention, reference is made to the appended claims.

We claim:

1. Apparatus for testing a seal comprising means including a rotatable heat conducting ring,
    means for mounting a seal with its inner periphery in contact with said ring and defining a chamber for receiving a test fluid in contact with one side of said seal, thermocouple means for measuring the temperature of said ring, said ring forming the junction of said thermocouple means,
    and means for indicating the rise rate of the temperature of said ring relative to said test fluid.

2. Apparatus for testing a seal comprising a rotatably mounted element,
    means for mounting a sealing ring in contact with said element, said means defining a chamber for receiving a test fluid in contact with one side of said sealing ring, thermocouple means for measuring the temperature of said element, said element forming the junction of said thermocouple means,
    means for effecting relative rotation between said element and said ring, and means for indicating the rise rate of the temperature of said element relative to said test fluid.

3. Apparatus for testing a seal comprising a rotatable heat conducting element,
means defining a test chamber containing a test fluid, said means including means for mounting a sealing ring with its inner periphery in contact with said element,
means for effecting relative rotation between said element and said sealing ring,
means for detecting the temperature of said fluid,
thermocouple means for detecting the average mean temperature of said element, said element forming the junction of said thermocouple means,
and means for indicating the rise rate of the average mean temperature of said element relative to said fluid.

4. Apparatus for testing a seal comprising a rotatably mounted cylindrically shaped heat conducting element,
means defining a test chamber containing a test fluid, said means including means for mounting a sealing ring with its inner periphery in contact with the outer surface of said element,
means for effecting relative rotation between said element and said sealing ring,
means for detecting the temperature of said fluid,
thermocouple means for detecting the average mean temperature of said element, said element forming the junction of said thermocouple means,
and means for indicating the rise rate of the average mean temperature of said element relative to said fluid.

5. Apparatus for testing a seal comprising a base,
a spindle rotatably supported by said base,
a metallic test ring of cylindrical shape,
adapter means formed of heat insulating material mounting said test ring for rotation with said spindle,
a test head including an outer jacket for receiving a heated fluid,
a seal retainer plate for mounting a seal with its inner periphery in contact with the outer diameter surface of the test ring,
the remaining surfaces of said test ring contacting said adapter means,
said plate supported by said test head and defining therewith an inner chamber for receiving a test fluid,
a pair of channels extending through said test ring and being located along a diameter of said ring,
a first conductor of one material located in one of said channels,
a second conductor of a material dissimilar to said one material located in the other channel whereby the test ring serves as a thermocouple junction,
a third conductor of the same material as said first conductor electrically connected with said first conductor,
a fourth conductor of the same material as said second conductor physically connected with said third conductor to form a second thermocouple junction,
said second junction being exposed to the temperature in said inner chamber,
means connected to the opposite ends of said second and fourth wires to indicate the rise rate of the temperature of said test ring relative to the temperature of the test fluid.

6. Apparatus for testing a seal comprising a rotatable spindle,
a test shaft assembly including a heat conducting test ring,
an adapter formed of a heat insulating material rotatable with said spindle and supporting said ring,
a pair of heat insulating elements located on opposite sides of said ring so as to expose only the outer surface of said ring,
and end cap adjacent one of said elements and coupled to said adapter,
means mounting said seal in contact with said outer surface,
means providing an enclosure for a test fluid in contact with said seal,
means for measuring the temperature of said test fluid,
and means for detecting the temperature of said test ring relative to said fluid.

7. A method of testing a seal comprising steps of positioning the seal with its inner periphery in contact with a heat conducting test ring,
introducing a test fluid to one side of said seal,
rotating said ring relative to said seal,
detecting the average mean temperature of said ring relative to said fluid,
measuring the increase of the temperature detected over a set interval of time.

8. A method of testing a seal comprising steps of positioning the seal with its inner periphery in contact with a heat conducting test ring,
introducing a test fluid to one side of said seal,
rotating said ring relative to said seal,
detecting the average means temperature of said ring relative to said fluid,
measuring the increase of the temperature detected over a set interval of time during which the temperature rise rate is substantially constant.

References Cited

UNITED STATES PATENTS 3,176,497 4/1965 Dega _____ 73—9

FOREIGN PATENTS 1,000,152 8/1965 Great Britain.
1,287,366 2/1962 France.

DAVID SCHONBERG, *Primary Examiner.*